United States Patent [19]

Hayashi

[11] Patent Number: 4,806,511

[45] Date of Patent: Feb. 21, 1989

[54] DIELECTRIC CERAMIC COMPOSITION

[75] Inventor: Mitsunobu Hayashi, Soma, Japan

[73] Assignee: Alps Electric Co., Ltd., Japan

[21] Appl. No.: 188,725

[22] Filed: Apr. 29, 1988

Related U.S. Application Data

[63] Continuation of Ser. No. 27,809, Mar. 19, 1987, abandoned.

[30] Foreign Application Priority Data

Jul. 24, 1986 [JP] Japan ............................... 61-172856

[51] Int. Cl.$^4$ .............................................. C04B 35/26
[52] U.S. Cl. .................................................... 501/135
[58] Field of Search ........................................... 501/135

[56] References Cited

U.S. PATENT DOCUMENTS

| | | | |
|---|---|---|---|
| 3,919,099 | 11/1975 | Fenner | 252/63.2 |
| 4,222,783 | 9/1980 | Atsumi | 501/139 |
| 4,236,928 | 12/1980 | Yonezawa | 501/134 |
| 4,319,485 | 3/1982 | Terada | 501/136 |
| 4,405,474 | 9/1983 | Murase | 501/136 |

FOREIGN PATENT DOCUMENTS 121161  3/1984  European Pat. Off. .
812343  4/1959  United Kingdom ................ 501/135

Primary Examiner—William R. Dixon, Jr.
Assistant Examiner—Andrew Griffis
Attorney, Agent, or Firm—Guy W. Shoup; Paul J. Winters; Leighton K. Chong

[57] ABSTRACT

A dielectric ceramic composition comprises adding CuO of 0.5-2 parts by weight to a composite of 100 parts by weight, said composite being expressed by $$[Pb_{1-x} Ba_x][(Fe_{\frac{1}{2}}Nb_{\frac{1}{2}})_Y (Fe_{\frac{2}{3}}W_{\frac{1}{3}})_Z (Zn_{\frac{1}{3}}Nb_{\frac{2}{3}})_W]O_3$$

wherein $0.05 \leq X \leq 0.20$, $0.10 \leq Y \leq 0.20$, $0.35 \leq Z \leq 0.45$ $0.40 \leq W \leq 0.50$, and $Y+Z+W=1$. Therefore, it can be sintered particularly at low temperature and the temperature-changing ratio of its dielectric constant is small as well. It is thus suitable for laminated substrates and chip capacitors.

1 Claim, 1 Drawing Sheet

FIG. I
Ternary Composition Plot
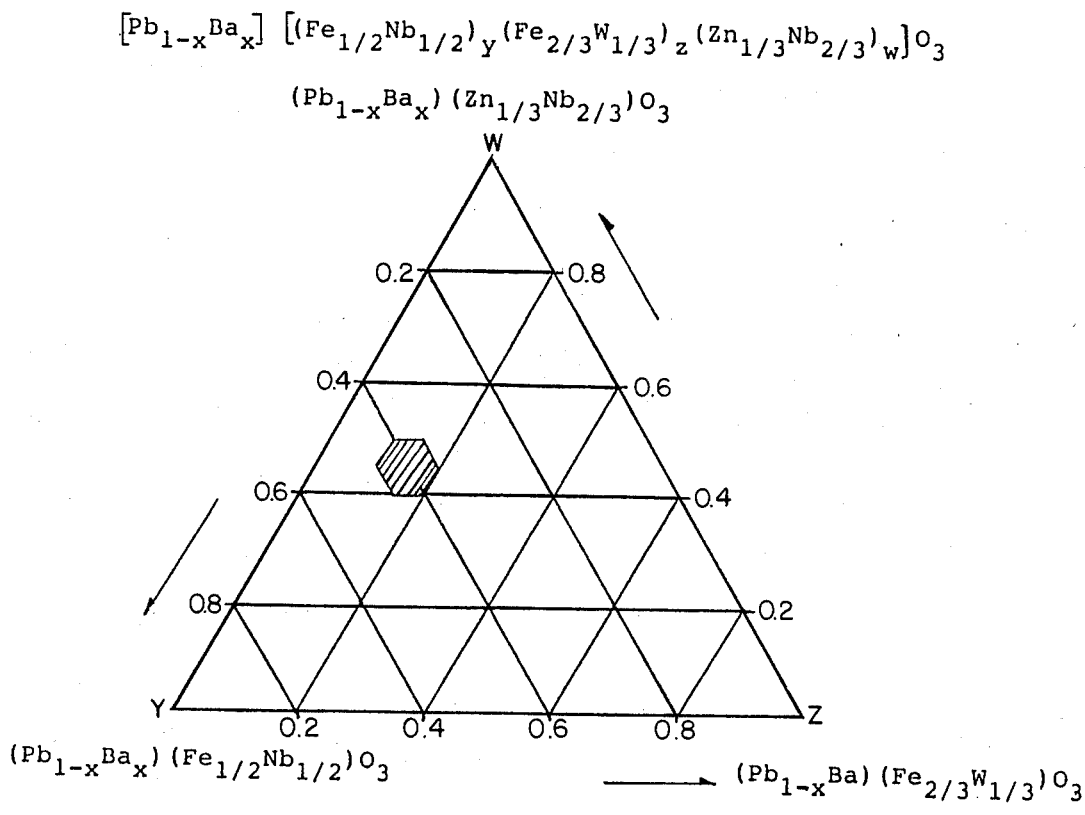
$$[Pb_{1-x}Ba_x][(Fe_{1/2}Nb_{1/2})_y(Fe_{2/3}W_{1/3})_z(Zn_{1/3}Nb_{2/3})_w]O_3$$
$0.05 \leq x \leq 0.20$
$0.35 \leq y \leq 0.45$
$0.10 \leq z \leq 0.20$
$0.40 \leq w \leq 0.50$

DIELECTRIC CERAMIC COMPOSITION

This is a continuation application from application Ser. No. 027,809 filed Mar. 19, 1987, now abandoned.

BACKGROUND OF THE INVENTION

(a) Field of the Invention

The present invention relates to a dielectric ceramic composition and, more particularly, it relates to a dielectric ceramic composition which can be sintered at low temperature, whose dielectric constant has a small changing ratio relative to temperature, and which is most suitable for laminated substrates and chip capacitors.

(b) Prior Art

Ceramic compositions having barium titanate ($BaTiO_3$) as their main component have been widely used for ceramic dielectrics of high dielectric constant. Such compositions need a high temperature of 1,300°–1,400° C. as their sintering temperature, and the ceramic thus obtained shows a relative dielectric constant of 1,500 at room temperature and a relative dielectric constant of 10,000 at a Curie point of 120° C. The dielectric constant of this ceramic also shows a large changing ratio of several times room temperature. Due to the high sintering temperature of 1,300°–1,400° C. and, particularly in the case of forming laminated capacitors, therefore, metal whose main component is expensive platinum, palladium or the like suitable for this sintering temperature must be used as the inner electrodes. A ceramic composition which can be sintered at low temperature, particularly lower than 1,000° C., which has a relative dielectric constant larger than 1,500, and whose dielectric constant has a small changing ratio relative to temperature is needed.

SUMMARY OF THE INVENTION

The present invention is intended to eliminate the above-mentioned drawbacks. The object of the present invention is therefore to provide a dielectric ceramic composition which can be sintered at a temperature lower than 1,000° C., which has a relative dielectric constant larger than 5,000, and which has a small changing ratio relative to temperature.

This object of the present invention can be achieved by a dielectric ceramic composition comprising adding CuO of 0.5–2 parts by weight to a composite of 100 parts by weight, said composite being express by $$(Pb_{1-x}Ba_x)((Fe_{\frac{1}{2}}W_{\frac{1}{2}})_y(Fe_{\frac{1}{2}}Nb_{\frac{1}{2}})_z(Zn_{\frac{1}{3}}Nb_{\frac{2}{3}})_w)O_3 \quad (1)$$

wherein $0.05 \leq X \leq 0.20$, $0.10 \leq Y \leq 0.20$, $0.35 \leq Z \leq 0.45$ $0.40 \leq W \leq 0.50$, and $Y+Z+W=1$.

In the case of the dielectric ceramic composition according to the present invention, X, Y, Z and Y in the formula (1) must meet the conditions of $0.05 \leq X \leq 0.20$, $0.10 \leq Y \leq 0.20$, $0.35 \leq Z \leq 0.45$, $0.40 \leq W \leq 0.50$, and $Y+Z+W=1$.

A ternary composition plot of the above specified compositional ranges is shown in FIG. 1.

When X is smaller than 0.05 and exceeds 0.20, the relative dielectric constant of the dielectric ceramic composition becomes smaller than 1,500. When Y is smaller than 0.10, sintering is not sufficient at a temperature lower than 1,000° C. and when Y exceeds 0.20, the temperature-changing ratio of the dielectric constant becomes large and negative. When Z is in ranges smaller than 0.35 or larger than 0.45, sintering is not sufficient at a temperature lower than 1,000° C. When W is smaller than 0.40 or exceeds 0.50, sintering becomes impossible at a temperature lower than 1,000° C.

As described above, the dielectric ceramic composition expressed by the formula (1) can be sintered at a temperature lower than 1,000° C., particularly at a temperature ranging from 800°–900° C. In the case where laminated capacitors are formed, therefore, metal such as silver, which is relatively low in melting point and inexpensive, can be used for the inner electrodes. In addition, a less expensive sintering furnace can be used to save heat energy.

When the amount of CuO added to the composite expressed by the formula (1) is smaller than 0.5 parts by weight, the relative dielectric constant of the dielectric ceramic composition thus obtained is 5,000 or less. When the amount of CuO added exceeds 2 parts by weight, the relative dielectric constant is high but dielectric loss becomes large. The dielectric ceramic composition has a small temperature-changing ratio of its dielectric constant, so that circuits made of it can be made stable relative to temperature.

DETAILED DESCRIPTION OF THE PREFERRED EMBODIMENT

Using lead monoxide (PbO), barium carbonate ($BaCO_3$), iron oxide ($Fe_2O_3$), tungstic oxide ($WO_3$), niobium oxide ($Nb_2O_5$), zinc oxide (ZnO) and copper oxide (CuO) as starting materials, the composites shown in Tables 1 and 2 were made. They were then wet-mixed and false sintered (e.g., for about five hours) at a temperature of 780°–820° C.

Thereafter, they were wet-ground by a ball mill and dried, then were pressure-formed by a pressure of about 0.5 ton/cm² into discs each having a diameter of about 30 mm and a thickness of 1.5 mm and then sintered (e.g., for about fifteen minutes) at a temperature of 900° C. Silver electrodes were baked to the sintered materials thus obtained. Tables 1 and 2 show properties of the ceramic compositions thus obtained. Dielectric constants and losses were measured at a frequency of 1 KHz and a temperature of 20° C. Temperature-changing ratios of the dielectric constants were calculated from the following formula:

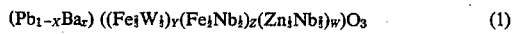

$$\{[\epsilon_{(80)} - \epsilon_{(20)}]/_{(20)}\} \times 100$$

wherein $\epsilon_{(80)}$ denotes dielectric constants at a temperature of 80° C. and $\epsilon_{(20)}$ those at a temperature of 20° C.

As apparent from Tables 1 and 2, the dielectric ceramic composition of the present invention has a relative dielectric constant larger than 5,000, its dielectric loss and temperature-changing ratio of its dielectric constant are small, i.e. comparable to good ceramic compounds, and it can be sintered at a temperature lower than 1,000° C. It is therefore suitable for laminated capacitors.

According to the dielectric ceramic composition of the present invention as described above, its relative dielectric constant is larger than 5,000, its dielectric loss and temperature-changing ratio of its dielectric constant are smaller, and it can be sintered at a temperature lower than 1,000° C. Therefore, electrodes whose main component is silver or the like can be used and even when these materials are used, the composition thus obtained has properties comparable to a high dielectric ceramic composition.

TABLE 1

| No. | composition ratio (molar ratio) part by weight | | | | | dielectric constant (ε) | dielectric loss (%) | change ratio of dielectric constant (%) |
|---|---|---|---|---|---|---|---|---|
| | X | Y | Z | W | CuO | | | |
| comparison example 1 | 0.05 | 0.15 | 0.425 | 0.425 | 0 | 6101 | 2.5 | −24 |
| our example 1 | " | " | " | " | 1 | 8538 | 4.7 | −22 |
| comparison example 2 | 0.10 | 0.15 | 0.350 | 0.500 | 0 | 3119 | 0.2 | −31 |
| our example 2 | " | " | " | " | 1 | 8755 | 6.5 | −33 |
| comparison example 3 | 0.10 | 0.15 | 0.425 | 0.425 | 0 | 5498 | 0.2 | −39 |
| our example 3 | " | " | " | " | 0.5 | 7237 | 0.2 | −40 |
| our example 4 | " | " | " | " | 1 | 8424 | 2.7 | −35 |
| our example 5 | " | " | " | " | 2 | 8582 | 5.2 | −37 |
| comparison example 4 | " | " | " | " | 3 | 8735 | 13.6 | −26 |
| our example 6 | 0.10 | 0.15 | 0.450 | 0.400 | 0 | 4327 | 0.2 | −40 |
| our example 7 | " | " | " | " | 1 | 8853 | 3.8 | −42 |
| comparison example 5 | " | " | " | " | 3 | 8031 | 18.7 | −27 |

TABLE 2

| No. | composition ratio (molar ratio) part by weight | | | | | dielectric constant (ε) | dielectric loss (%) | change ratio of dielectric constant (%) |
|---|---|---|---|---|---|---|---|---|
| | X | Y | Z | W | CuO | | | |
| comparison example 6 | 0.15 | 0.10 | 0.450 | 0.450 | 0 | 2468 | 0.1 | −37 |
| our example 8 | " | " | " | " | 1 | 6030 | 2.8 | −36 |
| our example 9 | " | " | " | " | 2 | 7932 | 4.7 | −35 |
| comparison example 7 | 0.15 | 0.15 | 0.425 | 0.425 | 0 | 3333 | 0.1 | −37 |
| our example 10 | " | " | " | " | 0.5 | 6257 | 0.8 | −32 |
| our example 11 | " | " | " | " | 2 | 8738 | 4.7 | −35 |
| comparison example 8 | 0.15 | 0.20 | 0.400 | 0.400 | 0 | 3438 | 0.1 | −38 |
| our example 12 | " | " | " | " | 0.5 | 7935 | 0.4 | −39 |
| our example 13 | " | " | " | " | 1 | 8247 | 2.8 | −37 |
| comparison example 9 | 0.20 | 0.15 | 0.425 | 0.425 | 0 | 1940 | 0.1 | −33 |
| our example 14 | " | " | " | " | 1 | 6583 | 3.8 | −30 |
| our example 15 | " | " | " | " | 2 | 7828 | 4.9 | −29 |

I claim:

1. A dielectric ceramic composition comprising adding CuO of 0.5–2 parts by weight to a composite of 100 parts by weight, said composite being expressed by $$[Pb_{1-X}Ba_X][(Fe_{\frac{2}{3}}W_{\frac{1}{3}})_Y(Fe_{\frac{1}{2}}Nb_{\frac{1}{2}})_Z(Zn_{\frac{1}{3}}Nb_{\frac{2}{3}})_W]O_3 \quad (1)$$

wherein $0.05 \leq X \leq 0.20$, $0.10 \leq Y \leq 0.20$, $0.35 \leq Z \leq 0.45$ $0.40 \leq W \leq 0.50$, and $Y+Z+W=1$, and having a dielectric constant greater than 5,000.